United States Patent Office 3,533,983
Patented Oct. 13, 1970

3,533,983
THERMOSETTING PHENYL GLYCIDYL ETHER DERIVATIVES OF ISOCYANATE-TERMINATED ORGANIC COMPOUNDS
Frank N. Hirosawa, Los Angeles, Calif., assignor to Furane Plastics Incorporated, Los Angeles, Calif., a corporation of California
No Drawing. Continuation-in-part of application Ser. No. 257,066, Feb. 8, 1963. This application June 1, 1966, Ser. No. 554,306
Int. Cl. C08g *22/08, 22/14, 51/04*
U.S. Cl. 260—37           12 Claims

ABSTRACT OF THE DISCLOSURE

Difunctional isocyanate compounds are reacted with monomethylol monophenyl glycidyl ether compounds to form definite chemical monomers, or polymers thereof, which may be cured at room or slightly higher temperatures after the addition of suitable curing agents, to form resins that vary, with specific ingredients, from mobile liquids to hard solids. The cured products have good flexibility, resistance to shock, high impact strength, resistance to the action of water and chemicals.

CROSS REFERENCE TO RELATED APPLICATIONS

This application is a continuation in part of my previously filed application Ser. No. 257,066 filed Feb. 8, 1963, now abandoned.

This invention relates to monomer compounds and polymers thereof comprising the monomethylol monophenylglycidyl ether derivatives of difunctional isocyanate compounds, and to the resinous products made therefrom.

One object of the invention is to provide an easily curable polyurethane type resin which is free from water sensitivity and toxicity. Another object is to provide phenyl glycidyl ether isocyanate adduct resins which are suitable for molding compounds, adhesive compositions, and surface coatings. Another object is to provide resins of the above types which may be varied from mobile liquids to hard masses, and which have, when cured, improved flexibility, resistance to shock, high impart strength and chemical resistance. A further object is to provide methylol derivatives of phenylglycidyl ether which have been reacted with derivatives having at least one —N=C=O group. A further object is to provide room temperature curing resins derived from monomethylol monophenylglycidyl ether and compounds containing at least one —N=C=O group.

I have discovered that monomer and polymer organic compounds having terminal isocyanate groups may be reacted with phenyl glycidyl ether compounds having active methylol group to form resinous compositions, whose physical properties may be varied over a wide range from liquids to hard solids, including rubbery or elastomeric semisolids, these variations attained by selection of the substituents of the reacting compounds. For example, if a strong, dimensionally stable thermosetting product is desired, stable benzene ring compounds with di- tri- or tetra-functional groups may be selected to control the degree of hardness. If on the other hand, a soft elastomeric rubber-like material is desired, a high molecular weight, long chain bi-functional compound avoiding cross-linking, would be selected.

It will be understood that in the present invention the term "phenyl glycidyl ether isocyanate derivative" refers to the isocyanate group, —N=C=O, which has substantially all of the nitrogen-carbon double bonds substituted by a compound having a terminal phenyl glycidyl ether group

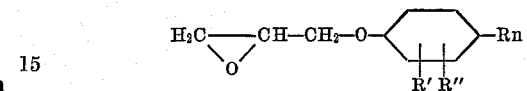

where R is essentially an aliphatic hydrocarbon bridge, $n$ is an integer and R' and R" represent hydrogen and hydrocarbon substituents of the aromatic nucleus, said substituent member having 1 to 18 carbon atoms.

The isocyanate groups referred to above as "terminal" groups include the following:

(a)     R—N=C=O
(b)     O=C=N—R—N=C=O
(c)     O=C=N—R—N=C=O
                          |
                        N=C=O where R is a simple or substituted alkyl, alicyclic aralkyl, alkaryl, furyl, aryl or polyurethane group.

The term polyurethane is defined as a class of polymers whose re-occurring linkage is a urethane unit

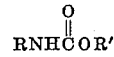

where R and R' may be a simple or substituted alkyl, alicyclic, aralkyl, furyl, aryl, or polymeric compound such as polyester, polyether and polyamide.

The reactivity of these isocyanate groups with a reactive hydrogen or another compound is well known and is illustrated by the classical example of the reaction between an alcohol and an aryl isocyanate to form urethane structures in accordance with the following equation:

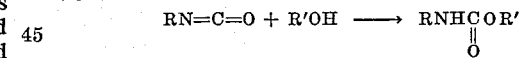

or in the reactions between diisocyanate and glycol, polyetherglycol or hydroxy-terminated polyester $n+1(\text{OCN}—\text{R}—\text{NCO}) + n+1(\text{HOR'HO}) \rightarrow$
  $\text{OCN}—\text{R}—\text{NHCO}[\text{OR'OOCNH}—\text{R}—\text{NHCO}]_n\text{OR'OH}$ in which a polyurethane is formed, the nature of terminal groups and length of the chain being dependent upon the reaction condition including the concentrations of the reactants.

Reactions of the type illustrated above have been employed in the preparation of isocyanate-terminated polyurethanes in the form of low viscosity liquids, syrups and solid materials.

The phenyl glycidyl ether isocyanate derivatives are believed to be formed in accordance with the following reaction equations:

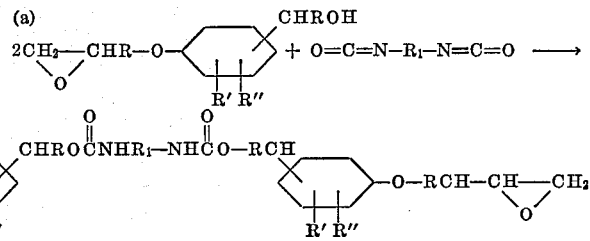

wherein R is substituent of the class consisting of hydrogen and a simple or substituted alkyl, alicyclic, aralkyl, alkaryl, furyl or aryl groups; R' is a simple or substituted alkyl, alicyclic, aralkyl, alkaryl, furyl or aryl group; $R_1$ is a simple or substituted alkyl, alicyclic, aralkyl, furyl, aryl, or polyurethane group, and R' and R'' represent hydrogen and hydrocarbon substituents of the aromatic nucleus, said substituent member having 1 to 18 carbon atoms.

The above reactions are carried out by the prior preparation of phenyl glycidyl ether derivatives of diisocyanate or polydiisocyanate, involving the reaction of (1) monomethylol phenolic compound corresponding to the general formula:

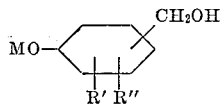

where M is a member selected from the class consisting of hydrogen sodium, potassium, calcium or barium, and R' and R'' represent hydrogen and hydrocarbon substituents of the aromatic nucleus, and substituent member having 1 to 18 carbon atoms and (2) an alkylene oxide corresponding to the general formula:

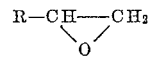

where R is a member selected from the class consisting of a halogen-substituted aliphatic radical, e.g., chloromethyl, bromomethyl, etc., (3) Tolylene diisocyanate, phenylene diisocyanate, isocyanate-terminated polyurethane, etc. An illustration of the preparation of polyglycidyl ether derivatives of isocyanate compounds may be represented as follows:

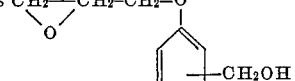

Illustrative examples of the preparation of phenyl glycidyl ether derivatives of isocyanate-terminated polyurethane compounds may be represented as follows:

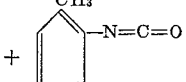

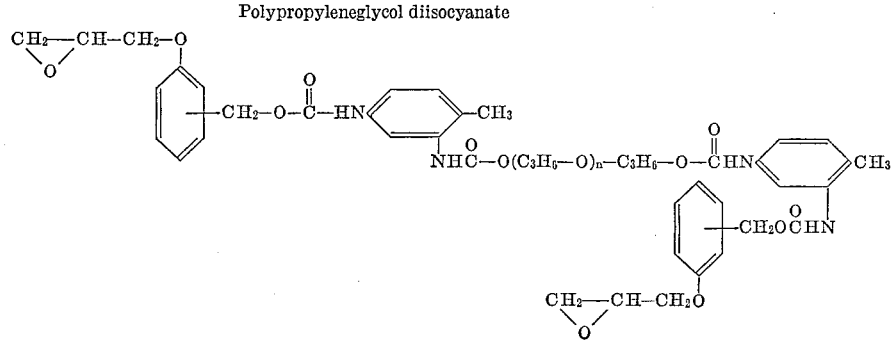

(b)

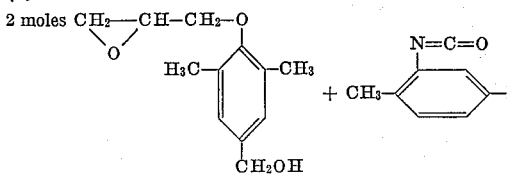
4-Hydroxymethyl-2,
6-dimethylphenyl glycidylether

+ 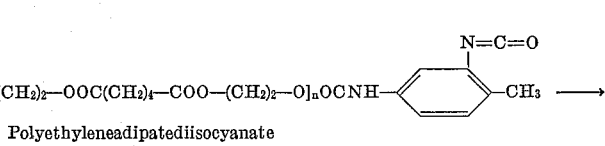
Polyethyleneadipatediisocyanate

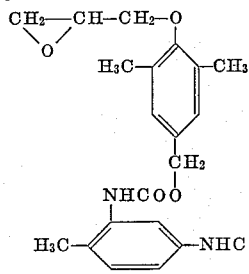

⟶

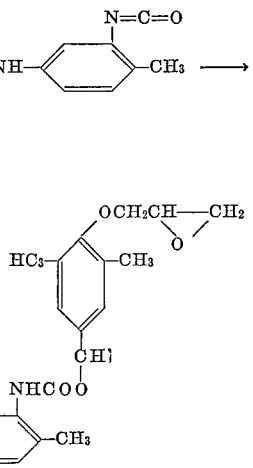

The term $n$ is a whole number from 1 to 20 denoting the number of segments in the chain-extended interpolymer.

According to the above equations, the moles of phenyl glycidyl ether derivatives required are equal to the number of moles of diisocyanate compound multiplied by the number of isocyanate groups in the compound.

Illustrative examples in the general class of compounds containing at least one active hydrogen attached to the molecule and containing at least one reactive phenyl glycidyl ether group, which can be reacted in accordance with the present invention are represented in Table I.

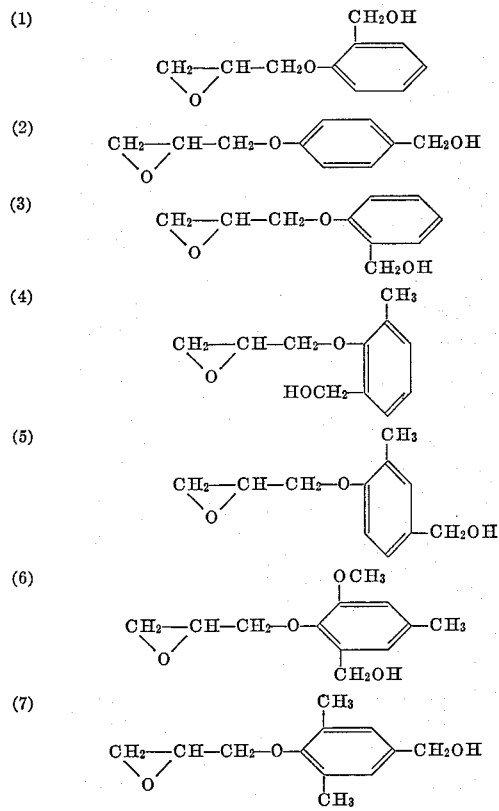

Examples of the class designated as diisocyanate compounds, and employed in the preparation of isocyanate-terminated polyurethane compounds, which can be reacted in accordance with this invention are represented in Table II.

TABLE II (1) m-Phenylene diisocyanate
(2) p-Phenylene diisocyanate
(3) Hexamethylene diisocyanate
(4) 2,4-Tolylene diisocyanate
(5) 2,6-Tolylene diisocyanate
(6) Tolylene diisocyanate mixture (80/20 and 60/40, 2,4- and 2,6-isomer).
(7) 3,3'-Dimethyl-4,4'-biphenylene diisocyanate
(8) 3,3'-Dimethoxy-4,4'biphenylene diisocyanate
(9) 2,2', 5,5'-Tetramethyl-4,4'-biphenylene diisocyanate
(10) 4,4'-Methylene bis (phenyl isocyanate)
(11) 4,4'-Methylene bis (2-methyl phenyl isocyanate)
(12) 4,4'-Sulfonyl bis (phenyl isocyanate)
(13) Naphthalene-1,5-diisocyanate
(14) Triphenylmethane triisocyanate
(15) Xylylene diisocyanate
(16) Polypropylene diisocyanate.

The process, according to this invention, is carried out by reacting a compound, which may be a monomer or a polymer having a terminal isocyanate group (Table II) with a phenyl glycidyl ether compound having at least one reactive methylol attached to the molecule (Table I) at a temperature not in excess of 150° C. until a test shows no reactivity with tertiary alkanolamine. The reaction time may be from a few minutes to 100 hours or more, depending upon the reaction conditions and the individual activities of the ingredients.

The following examples are intended to be illustrative only, since in the light of these examples, variations and modifications will be readily understood.

EXAMPLE I (a) Nine hundred and forty (940) grams (10 moles) of phenol, 420 grams (14 moles of formalin (37% by weight of formaldehyde) and 480 grams (12 moles) of sodium hydroxide dissolved in 480 ml. of water were mixed together in an ice bath with efficient stirring. The temperature of the reaction mixture rose spontaneously to a maximum of 35° C., and then dropped slowly to room temperature. The mixture was kept at room temperature for 15 to 72 hours, then neutralized with dilute acetic acid and extracted with acetone. Acetone was removed under reduced pressure with a water aspirator, and then with high vacuum pump at .02 mm. Hg to a pot temperature of 35° C.

A tan colored, semi-crystalline mass was filtered out to obtain 540 grams of crude crystalline compound (approximately 43% of the theoretical). The crude compound once recrystallized from acetone, yielded colorless crystals which melted from 94° C.–104° C. The analysis indicated that the compound was a mixed isomer and the amount of water evolved indicates that the compound is an isomer of fairly pure monomethylol phenol. (Ref. "The reaction of Phenol with Formaldehyde," Sprengling, G. R., & Freeman, J. A., J. American Chemical Society, 72, 1982–85 (1950); "Chemistry of Phenolic Resins," Martin, R. W., pp. 32–39, John Wiley & Sons, New York (1956).

(b) Two hundred and forty-eight (248) grams (2 moles) of methylolphenol were prepared as above and 1850 grams (20 moles) of epichlorohydrin were mixed together in a 5 liter three neck flask, equipped with stirrer, thermometer, dropping funnel and heating mantle, and heated to 35° C. Thereafter, 176 grams (2.2 moles) of 50% aqueous solution of sodium hydroxide were added over a period of 8 hours, while the mixture was continuously stirred. After complete addition of the sodium hydroxide, the solution was stirred for an additional one hour, the temperature being maintained at between 30°–35° C. After neutralizing the excess base with diluted hydrochloric acid, the mixture was allowed to phase separate and the aqueous layer was distilled under reduced pressure of 10 mm. Hg to a pot temperature of about 40° C., and residual salt was filtered out. The filtrate was distilled under reduced pressure of .03 mm. Hg and the collected fraction, boiling at 115°–125° C., crystallized upon standing at room temperature. The epoxy equivalent was 185 (theoretical 180) (Ref. "Phenol Alcohol Epichlorohydrin Reaction Products," Martin, R. W., U.S. Pat. 2,659,710 (Nov. 17, 1953).

One hundred and eighty (180) grams (1 mole) of methylol phenyl glycidyl ether prepared as above, were reacted with 87 grams (.5 mole) of "Nacconate 80" (80/20, 2,4 and 2,6-tolylene diisocyanate isomer mixture, supplied by National Aniline, Division of Allied Chemical Corporation) in a 65° C. sealed container for 4 hours. At the end of the 4-hour period a tan solid mass was obtained. The compound melted without sign of decomposition or polymerization. At temperatures above 175° C., prolonged heating tended to convert the compound to a clear, insoluble, infusible, very tough, glass-like material.

Fifty parts by weight (50) of diisocyanate derivative prepared as above and nine parts by weight of m-phenylenediamine were ground together. The finely ground and well-mixed compound was placed in a 150° C. oven; it melted immediately, and in a few minutes, was converted to a light brown, insoluble, infusible compound.

EXAMPLE I-A

The described monomethylol phenylglycidyl ether of Example I was reacted in the same mole proportions with 4,4'-methylene bis (phenyl isocyanate), under the same conditions, and gave similar products.

EXAMPLE I-B

The described monomethylol phenylglycidyl ether of Example I was reacted with 3,3'-dimethoxy-4,4'-biphenylene diisocyanate, in the same mole proportions, under the same conditions, and gave similar products.

EXAMPLE I-C

The described monomethylol phenylglycidyl ether of Example I was reacted with m-xylylene diisocyanate, in the same mole proportions and under the same conditions, and gave similar products.

EXAMPLE I-D

A phenylglycidyl ether urethane of 2,4-tolylene diisocyanate, prepared as in Example I was mixed and pulverized with about 13 percent of m-phenylenediamine, and then cured at 150° C. to a heat-stable, chemically resistant thermosetting resin composition.

EXAMPLE I-E

A phenylglycidyl ether urethane of 2,4 and 2,6-tolylene diisocyanate isomer mixed prepared as in Example I, was mixed and pulverized with about 13 percent of m-phenylenediamine, and then cured at 150° C. to a heat-stable, chemically resistant thermosetting composition.

EXAMPLE I-F

A phenylglycidyl ether urethane of 3,3'-dimethyl-4,4'-biphenylene diisocyanate was mixed and pulverized with about 8 percent of m-phenylenediamine, and then cured at 150° C. to a heat-stable, chemically resistant thermosetting composition.

EXAMPLE I-G

A phenylglycidyl ether urethane of 3,3'-dimethoxy-4,4'-biphenylene diisocyanate was mixed and pulverized with about 8 percent of m-phenylenediamine, and then cured at 150° C. to a heat-stable, chemically resistant thermosetting composition.

EXAMPLE I-H

A phenylglycidyl ether urethane of 4,4'-methylene bis (phenyl diisocyanate) was mixed and pulverized with about 8 percent of m-phenylenediamine, and then cured for 2 hours at 150° C. to a heat-stable, chemically resistant thermosetting composition.

EXAMPLE I-I

A phenylglycidyl ether urethane of m-xylylene diisocyanate and pulverized with about 10 percent of m-phenylenediamine, and then cured for 1 hour at 150° C. to a heat-stable, chemically resistant thermosetting composition.

EXAMPLE II (a) A charge of 522 grams (3 moles) tolylene diisocyanate (80%, 2,4 —20%, 2,6, -isomer mixture) was placed in a 5 liter three neck round bottom flask fitted with an agitator, thermometer, calcium chloride drying tube outlet, and dry nitrogen inlet tube. The agitator was started and slow flow of dry nitrogen gas was passed through the reaction vessel. To the diisocyanate was added 3000 grams (1.5 moles) of polypropyleneglycol of average molecular weight of 2000. It was then heated to 65°–70° C. over a period of 30 to 40 minutes, and held at this temperature for two hours. The product was then cooled to room temperature.

(b) Polypropylene diisocyanate prepared as above and monomethylol phenylglycidylether prepared as in Example I were reacted in a closed container at 65° C. for two hours. The diglycidyl ether urethane composition obtained was not sensitive to atmospheric moisture and was found to be quite heat-stable.

One hundred (100) parts by weight of compound prepared as in II–B above and 2.5 parts by weight of m-phenylenediamine were cured at 100° C. for 16 hours. The cured compound had excellent rubber-like properties and good organic solvent resistance.

One hundred (100) parts by weight of compound prepared as in II–B above and 3.5 parts by weight of diethylenetriamine were cured at ambient room temperature for 24 hours. The compound had excellent rubber-like properties and good abrasion resistance.

EXAMPLE III (a) One hundred and twenty-four (124) grams (1 mole) of o-hydroxybenzyl alcohol were dissolved in 925 grams of acetone and 925 grams (10 moles) of epichlorohydrin. The mixture was stirred and heated to 36° C. Sodium hydroxide solution (88 grams or 1.1 mole of 50 percent solution) was then added in units of 1/16 of the total volume at 30 minute intervals. After the final addition of sodium hydroxide, the mixture was allowed to react at 35° C. for an additional hour. The mixture was then allowed to phase separate and an aqueous layer drawn off and discarded. The organic layer was stripped to a pot temperature of 135° C. under reduced pressure of 35 mm. Hg yielding o-methylolphenylglycidylether.

(b) One hundred and eighty (180) grams (1 mole) of o-methylolphenylglycidyl ether prepared as above and 87 grams (.5 mole) of 2, 4 and 2,6-mixed isomer of tolylene diisocyanate were placed in a 250 ml. three neck round bottom flask and mixed thoroughly. The mixture was then heated to 65° C. over a period of 30 minutes and held at this temperature for 2 hours. The product obtained was a colorless crystalline compound with good room temperature stability, which can be cured with methylenedianiline to a tan colored, insoluble, infusible material, in 15 minutes, at 150° C.

EXAMPLE IV

Following the procedure described in Example II–B, 360 grams (2 moles) of o-methylolphenylglycidylether and 1250 grams of "Adiprene L–167" (liquid polytetramethylene ether glycol base urethane prepolymer sold by E. I. du Pont de Nemours Company) were reacted at 65° C. for 2 hours. The product obtained has a viscosity of 11,000 cps. at 25° C. and an epoxy equivalent of 850.

Fifty (50) parts by weight of the above compound and 10 parts by weight of "NMA"—(Nadic Methyl Anhydride, trade name used by National Aniline, Division of Allied Chemical Corp. for Methylbicyclo (2,2,1)-heptene-2,3-dicarboxylic anhydride isomer) and 10 drops of benzyldimethylamine were mixed thoroughly and placed in an oven at 150° C. The material gelled at 150° C. in about 10 minutes, and became cured to an abrasive, chemically resistant, very tough rubber-like product, in 2 hours at 150° C. Fifty (50) parts by weight of this same compound was cured with 4 parts by weight of a hardener consisting essentially of diethylenetriamine at ambient room temperature for 24 hours, to obtain an excellent rubber-like product with excellent abrasion resistance.

EXAMPLE V

Fifty (50) parts by weight of a liquid commercial epoxy resin of the class formed from bisphenol-A and epichlorohydrin in an alkaline medium and having epoxy equivalent weight of 190–195 were blended with 25 parts by weight of phenylglycidyl urethane prepared from "Adiprene L–167" and monomethylolphenylglycidylether as in Example IV, and 10 parts by weight of a hardener consisting essentially of triethylenetetramine. The mixture was cured at ambient room temperature until a hard, dense, insoluble casting was produced. The clear, light amber resin obtained had high impact strength.

EXAMPLE VI

Fifty (50) parts by weight of a liquid epoxy resin formed by reacting bisphenol-A and epichlorohydrin in an alakaline medium (epoxy equivalent of 190–195) were mixed with 25 parts by weight of diglycidylether urethane as prepared in Example IV and 35 parts by weight of "NMA" (nadic methyl anhydride). The blend gelled in 10 minutes at 150° C. and cured to a brown, hard casting resin of high impact strength.

EXAMPLE VII (a) Eight hundred and fifty-four (854) grams (7 moles of 2,6-xylenol, 680 grams (8.4 moles) of Formalin (37% by weight of formaldehyde) and 1120 grams (8.4 moles) of 30% sodium hydroxide solution were mixed together in an ice batch with efficient stirring. The temperature of the reaction mixture rose spontaneously to a maximum of 50° C., and then dropped slowly to room temperature. The mixture was kept at room temperature for 15 to 72 hours, then neutralized with 20% acetic acid solution to pH of 7, and crystalline precipitate was filtered out, to obtain 982 grams of crude crystalline compound (approximately 92% of the theoretical). The crude compound, twice recrystallized from hot benzene, yielded colorless crystals which melted from 102°–103° C.

(b) Seven hundred and sixty (760) grams (5 moles) of 4-hydroxy methyl-2,6-xylenol were prepared as above and 4,625 grams (50 moles) of epichlorohydrin were mixed together in a 12 liter three neck flask, equipped with stirrer, thermometer, dropping funnel and heating mantle, and heated to 35° C. Thereafter, 800 grams (6 moles) of 30% aqueous solution of sodium hydroxide were added over a period of 2.5 hours, while the mixture was continuously stirred. After complete addition of sodium hydroxide solution, the solution was stirred for an additional one hour, the temperature being maintained at between 55°–60° C. After neutralizing the excess hydroxide with dilute hydrochloric acid, the mixture was allowed to phase separate and the aqueous layer was distilled under reduced pressure of 15 mm. Hg to a pot temperature of about 40° C., and residual salt was filtered out. The filtrate was distilled under reduced pressure of 0.075 mm. Hg and the collected fraction, boiling 148°–152° C. The measured epoxy equivalent was 210 (theoretical 208).

EXAMPLE VIII

One hundred and four (104) grams (.5 moles) of 4-hydroxy methyl-2,6-dimethylphenylglycidylether prepared as above and 43 grams (.25 mole) of 2,4 and 2,6-mixed isomer of tolylene diisocyanate were placed in a 250 ml. three neck round bottom flask and mixed thoroughly. The mixture was then heated to 65° C. over a period of 30 minutes and held at this temperature for 2 hours. The product obtained was a light yellow colored solid, which can be cured with m-phenylenediamine to a tan colored, insoluble, infusible material, in 30 minutes, at 150° C.

EXAMPLE IX

Following the procedure described in Example VIII, 104 grams (.5 mole) 4-hydroxy methyl-2,6-dimethylphenylglycidylether and 325 grams of Adiprene L–167 (liquid polytetramethylene glycol base urethane prepolymer sold by E. I. du Pont de Nemours Co.) were reacted at 65° C. for two hours. The product obtained had a viscosity of 45,000 cps. at 25° C. and an epoxy equivalent of 980.

One hundred (100) parts by weight of the above compound and 8 parts by weight of Nadic methyl anhydride (National Aniline Division of Allied Chemical Corp.) and .5 part by weight of benzyl dimethylamine were mixed thoroughly and cured in about 15 minutes at 150° C. to an abrasive, chemically resistant, very tough rubber-like product. Fifty (50) parts by weight of this compound were cured with 6 parts by weight of triethylenetetramine at ambient room temperature for 24 hours, to obtain a tough rubber-like product.

EXAMPLE X

Fifty-two (52) grams (.25 mole) of 4-hydroxy methyl-2,6-dimethylphenylglycidyl ether prepared as in Example VII–B, and .12 mole of 50% anhydrous benzene solution of each of the following diisocyanates were separately reacted as in Example VIII: 4,4'-biphenylene diisocyanate, 4,4'-methylene bis (phenyl isocyanate), 3,3'-dimethoxy-4,4'-biphenylene diisocyanate, and m-xylylene diisocyanate. Here, again, all adducts were solid crystalline compounds, that melted without any sign of decomposition, and formed very tough, clear nonthermoplastic compounds.

EXAMPLE XI

Polypropylene diisocyanate prepared as in Example II–A and 4-hydroxymethyl-2,6-dimethyl phenylglycidylether, prepared as in Example VII–B were reacted in a closed container at 65° C. for 2 hours. The diglycidyl urethane composition obtained was not sensitive to atmospheric moisture and found to be quite heat-stable.

Fifty (50) parts by weight of compound prepared as above and 2.5 parts by weight of methylenedianiline were cured at 100° C. for 8 hours. The cured compound had excellent elastomeric properties and good chemical resistance.

EXAMPLE XII

The solid phenylglycidylether urethane, prepared as described in each of the Examples: I–b, I–A, I–B, I–C, I-D, I-E, I-F, I-G, I-H, I-I, III, VII and X may be used in the preparation of molding compounds, or for use to produce fluidized bed coatings, in all cases having improved storage stability, abrasion and impact resistant properties.

A typical example of a molding power, following my invention, is a mixture containing 30 to 70 parts by weight of solid phenylglycidyl urethane resin, 30 to 60 parts by weight of an inorganic filler (such as aluminum silicate, silica, calcium carbonate, barium sulfate, etc.) and 5 to 20 parts by weight of solid epoxy hardener such as trimellitic anhydride, pyromellitic dianhydride, phthalic anhydride, methylene dianiline, m-phenylenediamine and various adducts derived from the above-mentioned curing agents.

In place of the above-mentioned curing agents, I may use small amounts of hardening catalysts such as boron complexes, organic metallic salts, and imidazoles.

The foregoing examples are illustrative of this invention and are not to be considered as limiting.

A distinct advantage of this invention is the provision of modified polyurethane compounds which are free from water sensitivity and toxicity which characterize the usual polyurethane compositions. A further advantage is the low cost of the many available raw materials and the facility with which the particular ingredients may be selected to control the physical properties of the cured resins. The reaction products may be readily cured with well-known catalysts and hardeners, to improve the impact strength and abrasion resistance.

A further, and most important advantage, is the ease with which monomethylol derivatives of phenylglycidylether and related compounds can be caused to react with derivatives containing at least one —N=C—O group, to obtain ambient room temperature curing resinous compositions.

I claim:

1. A composition comprising the reaction product of a difunctional isocyanate and a monomethylol monophenyl glycidyl ether, the proportions being about one molal weight of the diisocyanate to two molal weights of the ether, the ingredients having been reacted at temperatures in the range of about 20° to 100° C. for from one to ten hours.

2. The composition defined in claim 1 in which the diisocyanate compound is a polyfunctional monomer.

3. The composition defined in claim 1 in which the diisocyanate compound is a polyurethane.

4. The composition defined in claim 1 in which the difunctional isocyanate is selected from the group set forth in Table II, and the monomethylol monophenyl glycidyl ether compound is selected from the group set forth in Table I.

5. The composition defined in claim 1 in which the difunctional isocyanate is O=C=N—R—N=C=O where R is a simple or substituted alkyl, alicyclic, aralkyl, alkaryl, furyl, aryl or a polyurethane group.

6. The polymer composition defined in claim 3, in which the isocyanate compound has a re-occurring urethane group $$R-N-H-C-O-R'$$
$$\quad\quad\quad\underset{O}{\|}$$

where R and R' are simple or substituted alkyl, alicyclic, aralkyl, furyl, aryl, or polymeric compound such as a polyester, a polyether, or a polyamide.

7. The polymer composition comprising the reaction product 4 - hydroxy methyl - 2-6-dimethylphenylglycidyl ether and the mixed isomer, (1) 2,4-tolylene diisocyanate and (2) 2,6-tolylene diisocyanate, the proportions being about 1 molal weight the mixed diisocyanate isomers to two molal weights of the ether, the ingredients having been reacted at temperatures in the range of about 20° to 100° C. for from one to ten hours.

8. The polymer composition comprising the reaction product of 4-hydroxy methyl-2-6-dimethylphenylglycidyl ether and polyalkylene ether diisocyanate, the proportions being about one molal weight of the diisocyanate to two molal weights of the ether, the ingredients having been reacted at temperatures in the range of about 20° to 100° C. for from one to ten hours.

9. The polymer composition comprising the reaction product of 4-hydroxy methyl 2-6-dimethylphenylglycidyl ether and a diisocyanate selected from the group consisting of 4,4'-biphenyl diisocyanate; 4,4'-methylene bis (phenyl isocyanate); 3,3'-dimethoxy-4,4'-bi-phenylene diisocyanate; and m-xylylene diisocyanate, the proportions being about one molal weight of the diisocyanate to two molal weights of the ether, the ingredients having been reacted at temperatures in the range of about 20° to 100° C. for from one to ten hours.

10. The polymer composition comprising the reaction product of 4-hydroxy methyl-2-6-dimethylphenylglycidyl ether and polypropylene diisocyanate, the proportions being about one molal weight of the diisocyanate to two molal weights of the ether, the ingredients having been reacted at temperatures in the range of about 20° to 100° C. for from one to ten hours.

11. A molding powder comprising from 30 to 70 parts by weight of powdered phenylglycidylether urethane resin, 30 to 60 parts by weight of a powdered mineral filler, and from 5 to 20 parts by weight of a powdered epoxy hardener selected from the group consisting of trimellitic anhydride, pyromellitic dianhydride, phthalic anhydride, methylene dianiline, m-phenylenediamine, and adducts of said previously stated hardeners.

12. An epoxy-terminated polyurethane compound comprising the reaction product of (1) a hydroxymethyl monomethylol monophenyl glycidyl ether having the formula $$--CH_2--CH--CH--O-\underset{R_1\ R_2}{\underset{|\quad |}{\langle\phantom{xxx}\rangle}}-CH_2OH$$
$$\quad\underset{O}{\diagdown\diagup}\quad\overset{R}{|}$$

wherein R, $R_1$, and $R_2$ are each selected from the group consisting of hydrogen, alkyl radicals, aryl radicals and aralkyl radicals; and (2) a polyisocyanate compound having the formula $$O=C=N-R-N=C=O$$

wherein R is selected from the group consisting of simple or substituted alkyl, alicyclic, aryl, aralkyl, or a polymeric urethane compound derived from a hydroxy terminated polyester, a polyether, or polyamide; the proportions being about 2 molal weights of the ether to one molal weight of the polyisocyanate, the ingredients having been reacted at temperatures in the range of about 20° to 100° C. for from one to ten hours.

References Cited

UNITED STATES PATENTS

| | | | |
|---|---|---|---|
| 2,349,756 | 1944 | Pratt | 260—57 |
| 2,829,984 | 1958 | Yaeger | 117—132 |
| 2,830,038 | 1958 | Pattison | 260—77.5 |
| 2,659,710 | 1953 | Martin. | |

PAUL R. MICHL, Primary Examiner

U.S. Cl. X.R.

260—57; 260—77.5